(12) United States Patent
Newendorp et al.

(10) Patent No.: US 6,247,378 B1
(45) Date of Patent: Jun. 19, 2001

(54) OPERATOR CONTROL DEVICE FOR AN INFINITELY VARIABLE TRANSMISSION

(75) Inventors: Bruce Craig Newendorp; David Joseph Easton, both of Cedar Falls, IA (US); Nicolai Tarasinski, Frankenthal; Dieter Rückert, Reilingen, both of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/478,590

(22) Filed: Jan. 6, 2000

(51) Int. Cl.$^7$ .................................................. F16H 59/06
(52) U.S. Cl. .................... 74/473.12; 74/473.33; 74/473.3
(58) Field of Search .......................... 74/473.12, 473.33, 74/473.3; 474/69

(56) References Cited

U.S. PATENT DOCUMENTS

| | | | |
|---|---|---|---|
| 4,594,666 | * | 6/1986 | Cornell .................................. 701/58 |
| 4,864,894 | * | 9/1989 | Falzoni .................................. 474/44 |
| 5,142,928 | * | 9/1992 | Buti et al. ............................. 74/335 |
| 5,527,232 | * | 6/1996 | Seidel et al. .......................... 477/46 |
| 6,080,074 | * | 6/2000 | Ulbrich et al. ........................ 475/76 |

FOREIGN PATENT DOCUMENTS

| | | | |
|---|---|---|---|
| 2303183 | * | 2/1997 | (GB) . |
| 09123780 | * | 5/1997 | (JP) . |

* cited by examiner

Primary Examiner—Charles A Marmor
Assistant Examiner—Ankur Parekh

(57) ABSTRACT

A control device for an infinitely variable transmission includes a control lever that is movable along a guide slot and whose position within the slot indicates the commanded speed and direction. The control lever is moved forward from a zero speed position to a maximum forward speed position. Between the zero speed position and maximum forward speed position is a set point position corresponding to a set point speed. A set speed adjuster, such as a potentiometer, enables the operator to adjust the set point speed that is commanded when the control lever is placed in the set point position. The speed for positions of the control lever between the zero and the set point positions varies proportionally between zero and the set point speed. Likewise, the speed for positions of the control lever between the set point position and the maximum forward speed position varies proportionally between the set point speed and the maximum forward speed.

25 Claims, 5 Drawing Sheets

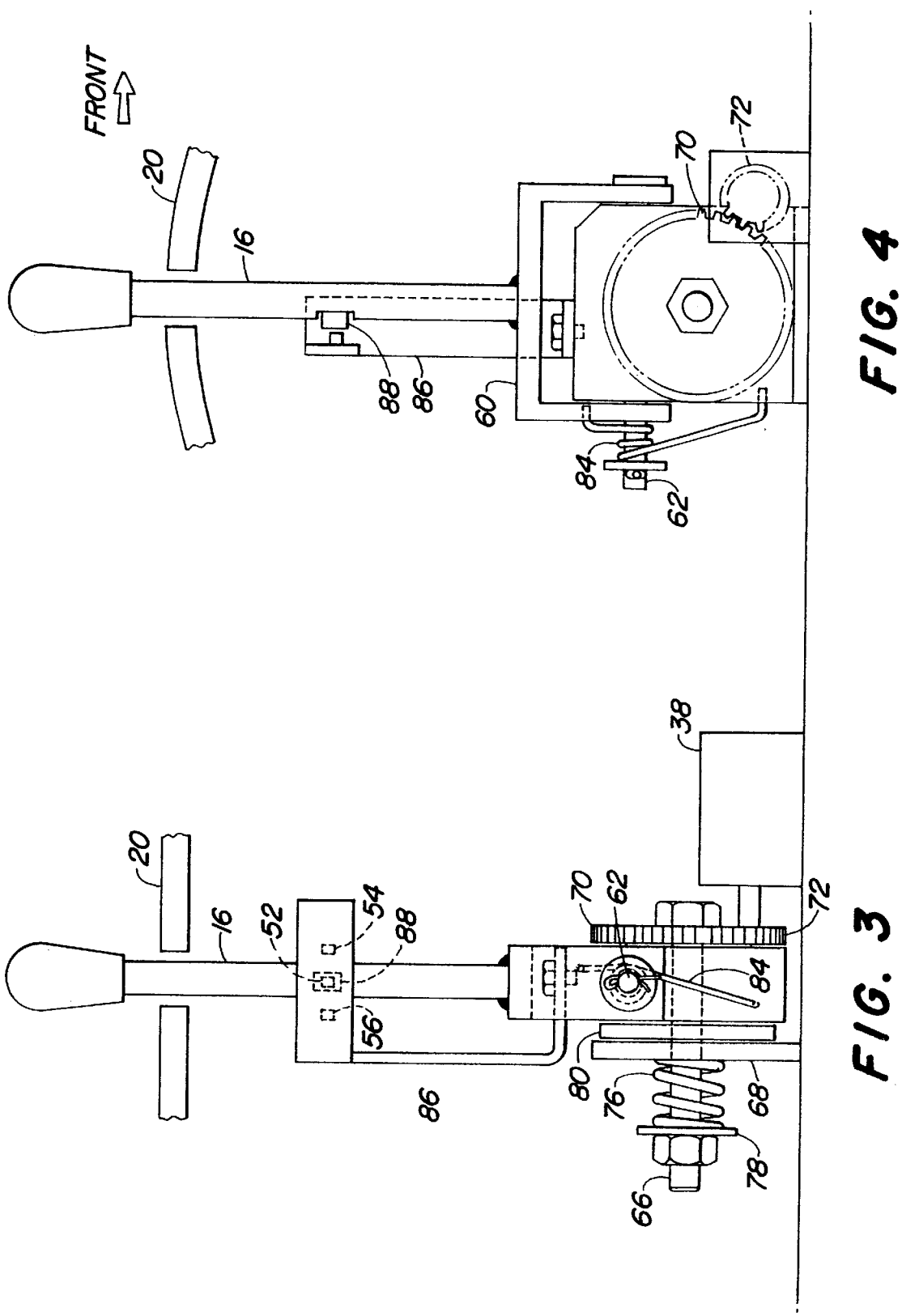

OPERATOR CONTROL DEVICE FOR AN INFINITELY VARIABLE TRANSMISSION

BACKGROUND OF THE INVENTION

1. Field of the Invention

The present invention relates to an operator control device for an infinitely variable transmission and in particular to a control device having a control lever that is movable between a minimum speed position and maximum speed positions and which has an intermediate set point position for which the operator can adjust a speed to be commanded when the lever is in the set point position.

2. Description of the Related Art

An infinitely variable transmission (IVT) has potential to provide a large range of speeds to a self-propelled work machine such as a construction machine, tractor, agricultural combine, cotton picker, forage harvester, etc. One benefit of an IVT is that it gives the operator the ability to select the speed that best matches the present task. The control device for the IVT needs to provide the operator with a means to adjust this speed. Currently available IVT control devices provide the operator with the ability to choose the desired speed. The means to choose the desired speed have been accomplished by various executions of two basic concepts. One concept provides a lever or similar device that is moved through a pattern to a position that corresponds to the desired speed. If a lever with good speed resolution is provided, i.e. the ability to make fine adjustments of the speed, the amount of lever travel will exceed the range of convenient reach for the operator. Likewise, a lever that is compact and convenient to reach does not provide sufficient speed resolution.

The other control concept provides a lever or similar device that only selects a travel direction based on the lever position, and by an alternate motion, incrementally increases or decreases the speed. For example, a lever that moves fore and aft to select the desired travel direction may also pivot left and right to increase and decrease speed respectively. The lever position only indicates travel direction but not the actual speed. The advantage of this concept is that the lever takes less space on the control console since it does not require a position for each speed. The lever is easy to reach for all speeds. A disadvantage of this concept is that the operator must hold the control lever to the left or right to increase or decrease the speed the entire time the vehicle speed is changing. To command a large speed change, the operator needs to hold the control lever in the proper position for the long time period required to accomplish the speed change. Some implementations of this control concept provide a means for the vehicle to remember a specific speed and easily return to it. This may be accomplished by a push button which, when depressed, remembers the current speed. This speed can be automatically returned to by moving the control lever to a specific position. The incrementing control must be used to attain speeds other than the remembered speed. This control does not provide a simple method to preset a vehicle speed prior to vehicle movement.

SUMMARY OF THE INVENTION

Accordingly, it is an object of the present invention to provide a control device for an infinitely variable transmission that overcomes the difficulties associated with the above control concepts.

The control device of the present invention includes a control lever that is movable along a guide slot and whose position within the slot indicates the commanded vehicle speed and direction. The control lever is moved forward from a zero speed position to a maximum forward speed position. Intermediate the zero speed position and forward speed position is a set point position corresponding to a set point speed. A set speed adjuster, such as a potentiometer, enables the operator to adjust the set point speed that is commanded when the control lever is placed in the set point position. The transmission speed for positions of the control lever between the zero and the set point positions varies proportionally between zero and the set point speed. Likewise, the transmission speed for positions of the control lever between the set point position and the maximum forward speed position varies proportionally between the set point speed and the maximum forward speed. The control lever is movable in a reverse direction for reverse direction and speed selection. In one embodiment of the control device, the maximum reverse speed is variable and equal to the set point speed.

In another embodiment, two set point speeds can be adjusted. A toggle switch allows the operator to switch between the two set point speeds to quickly change the transmission speed between the two set points without moving the control lever. The toggle switch may be hand or foot operated.

In a further embodiment, both a set point speed and a maximum speed can be adjusted. The set point speed corresponds to the set point position of the control lever while the maximum speed corresponds to the maximum speed position of the control lever.

In yet another embodiment of the invention, the control lever is movable between a minimum speed position and the maximum speed position where the minimum speed may be zero or a small value close to, but not equal to, zero. As used in the claims that follow, the term "minimum speed" includes a zero speed.

BRIEF DESCRIPTION OF THE DRAWINGS

FIG. 3 is rear view of the control lever mounting structure for the control device of the present invention.

FIG. 4 is a side view of the control lever mounting structure shown in FIG. 3.

DESCRIPTION OF THE PREFERRED EMBODIMENT

Figure 1:
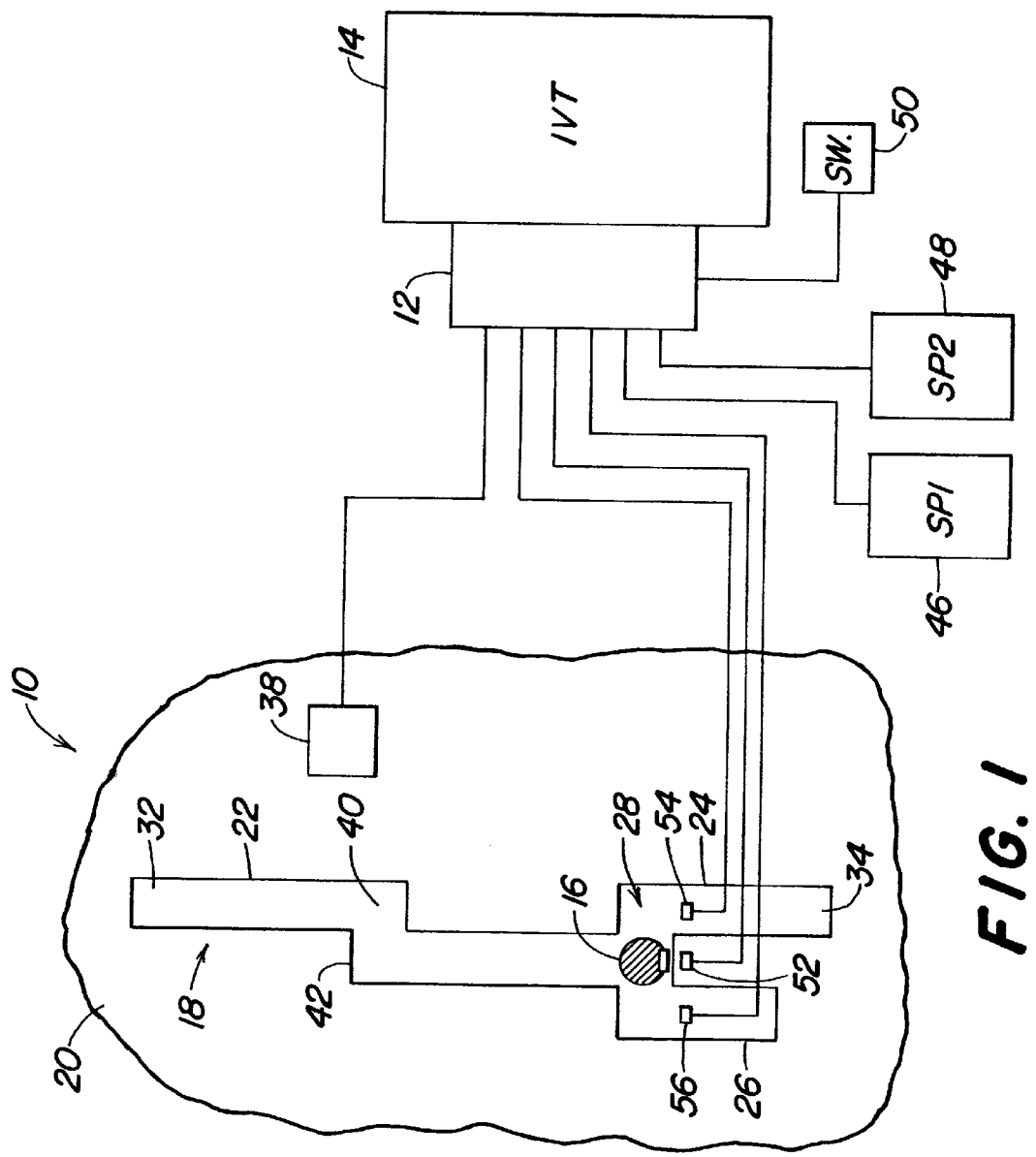
FIG. 1 is a schematic diagram of the control device according to the present invention.

The control device of the present invention is shown schematically in FIG. 1 and designated generally at 10. The control device 10 includes an electronic controller 12 coupled to an infinitely variable transmission (IVT) 14 to control the speed of the transmission. The controller 12 receives inputs from various components of the control device as described below. One such component is a control lever 16 that is moveable through a guide slot 18 in a guide plate 20. The guide slot 18 includes a forward direction and speed slot 22, a reverse direction and speed slot 24 and a park slot 26. All three slots are interconnected at a zero speed lateral slot 28. At the zero speed lateral slot 28, the control lever 16 is movable transversely between a park slot 26, the forward direction and speed slot 22 and the reverse direction and speed slot 24 respectively. The lateral slot 28 is also a zero speed position for the control lever.

The forward direction and speed slot 22 enables the control lever 16 to move from the zero speed position to the forward maximum speed position 32 at the forward end of the slot. Likewise, the control lever is movable through the reverse direction and speed slot 24 from the zero speed position to a maximum reverse speed position. The control lever 16 is also movable in the park slot from the zero speed position to a park position in the park slot 26. The fore and aft position of the control lever in the guide slot 18 is input to the controller 12 by a position sensor 38, such as an encoder or a potentiometer, operatively coupled to the control lever 16. In the zero speed position, the transmission commands a zero speed and holds the machine in a fixed position.

A forward set point position 40, defined by a jog 42 in the slot 22, is between the zero speed slot 28 and the maximum forward speed position 32. When the control lever 16 is moved to the forward set point position 40, a set point speed is commanded. The set point speed is adjustable by the operator via a set speed adjuster 46. The set speed adjuster 46 is coupled to the transmission controller 12 to input the set point speed to the controller. When the control lever is in the set point position 40, the controller 12 will command the set point speed, as set by the operator.

The commanded speed is variable between zero and the set point speed for positions of the control lever between the zero speed slot 28 and the set point position 40. Likewise, the command speed is variable between the set point speed and the maximum forward speed for positions of the control lever between the set point position and the maximum speed position. While a jog in the guide slot is shown for the set point position, it will be appreciated that various other means can be used to indicate the set point position of the control lever to the operator. These include indicia on the guide slot, a detent in the control lever mechanism, a notch on the guide slot, etc.

Figure 2:
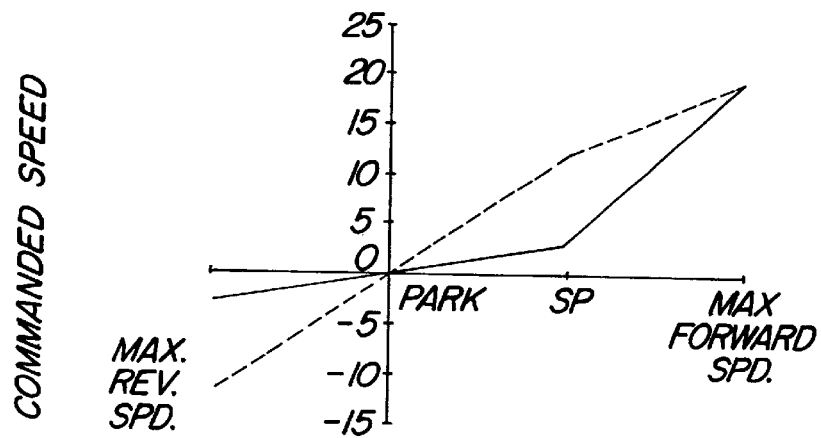
FIG. 2 an exemplary graph of the control lever position versus the commanded speed.

Two examples of the commanded speed versus lever position curve are shown in FIG. 2. The solid line curve is for a set point speed of 3 km/h while the broken line curve is for a set point speed of 12 km/h. In this embodiment of the control device, the maximum reverse speed is equal to the set point speed and is thus variable by the operator. The gain, or slope of the curve, is constant between the maximum reverse speed and the set point speed positions of the control lever. Another gain is constant between the set point speed and the maximum speed.

In another embodiment of the invention, a second set speed adjuster 48 is provided to adjust a second set point speed. A toggle switch 50 is also added that enables the operator to change the set point speed between the settings of the two adjusters 46, 48. The toggle switch can be on the floor of the machine for foot operation or on the console or steering column for hand operation.

In addition to the above inputs to the controller 12, three lateral position switches 52, 54, 56 are provided to input to the controller in which of the three slots 22, 24, 26 the control lever is positioned. The lateral position switches are described in more detail below.

The structure of the control lever is shown with reference to FIGS. 3 and 4. A yoke 60 is fixed to the lower end of the control lever 16. The yoke 60 is pivotally mounted on a lateral pivot pin 62 that is mounted to a pivot block 64. The pivot block 64 is in turn mounted on a main pivot 66. The main pivot is carried by one or more supports 68 (only one is shown) fixed to the structure of the console. As the control lever 16 is moved fore and aft, the control lever, yoke and pivot block rotate about the main pivot 66. Fixed to the pivot block is a gear 70. The gear 70 meshes with the input gear 72 of rotary position sensor 38 to input to the controller a signal corresponding to the position of the control lever about the main pivot 66. While a pivoting control lever is shown and described, other types of motion, such as a slide motion, could be used to accomplish the same function.

A spring 76 between the support 68 and a stop 78 carried on the main pivot urges the pivot block 64 to the left as viewed in FIG. 3. This forces the pivot block against a friction washer 80 that is sandwiched between the pivot block and the support 68. The friction from the washer 80 holds the control lever in the position about the main pivot 66 that the operator has placed the control lever.

The control lever rotates about the lateral pivot pin 62 as the control lever is laterally moved in the zero speed lateral slot between the three slots 22, 24, 26. A torsion spring 84 biases the control lever to the park slot when the control lever is in the zero speed lateral slot 28.

A lateral switch bracket 86 is carried by the pivot block for rotation about the main pivot 66 with the control lever 16. The bracket 86 carries the three lateral position switches 52, 54, 56. A magnet 88 on the control lever actuates each switch when the magnet is in proximity to the switch. When the control lever is in the forward direction and speed slot 22, the magnet is aligned with the switch 52 to input to the controller that the control lever is in the slot 22. The other switches 54, 56 are actuated when the control lever is in the reverse direction and speed slot 24 and the park slot 26, respectively.

Figure 5:
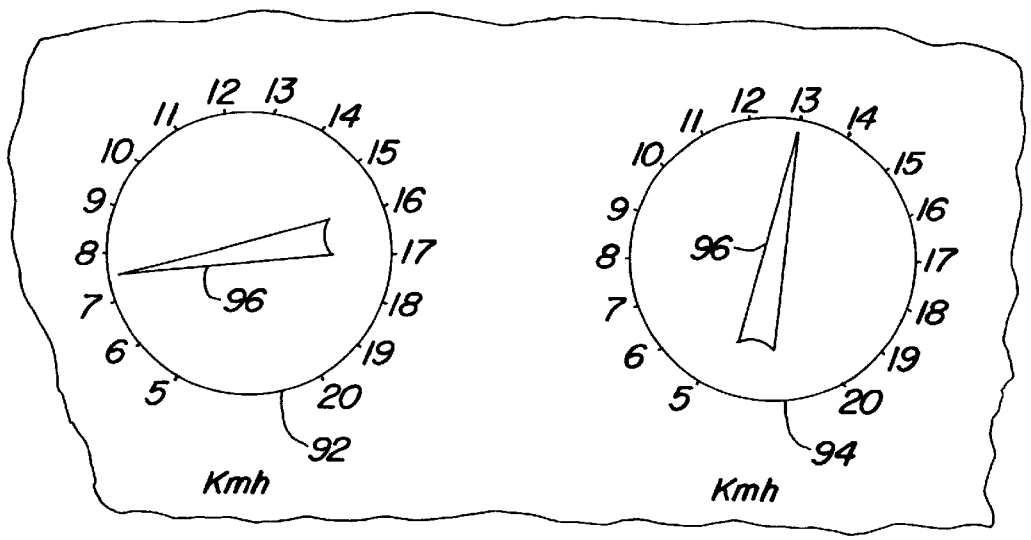
FIG. 5 is a top view of the control panel showing potentiometers used to adjust the set point speed.
Figure 6:
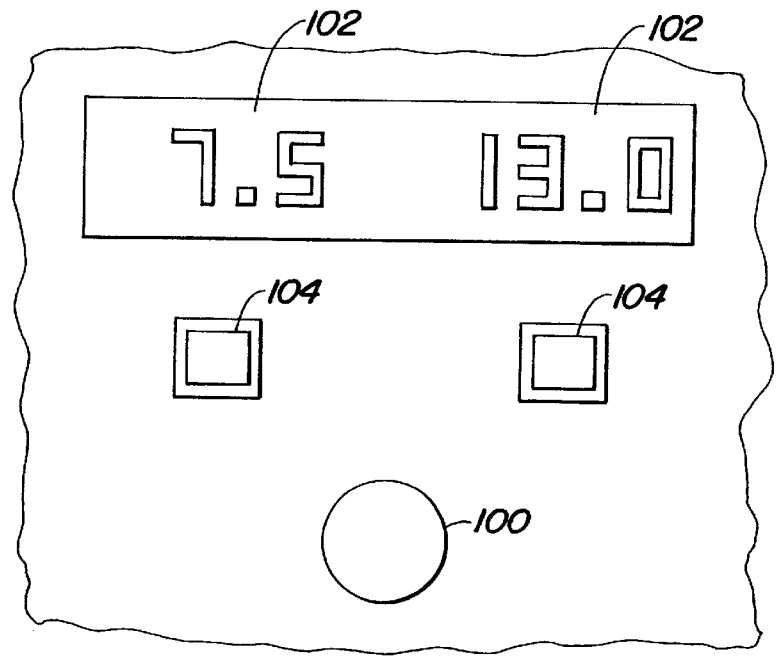
FIG. 6 is a top view of an alternative embodiment of the control panel showing a non-indicating encoder together with a display to adjust the set point speed.

The various inputs to the controller are used to determine the commanded speed and direction of the transmission. The set speed adjusters can be position indicating potentiometers as shown in FIG. 5 each having a knob 92, 94 with a needle 96 that points to speed values on the control panel, enabling the operator to adjust the set point speed before moving the machine. Alternatively, as shown in FIG. 6, a non-indicating encoder with two set speed displays 102 and two selector switches 104 may be used to input to the controller the set point speed.

Figure 8:
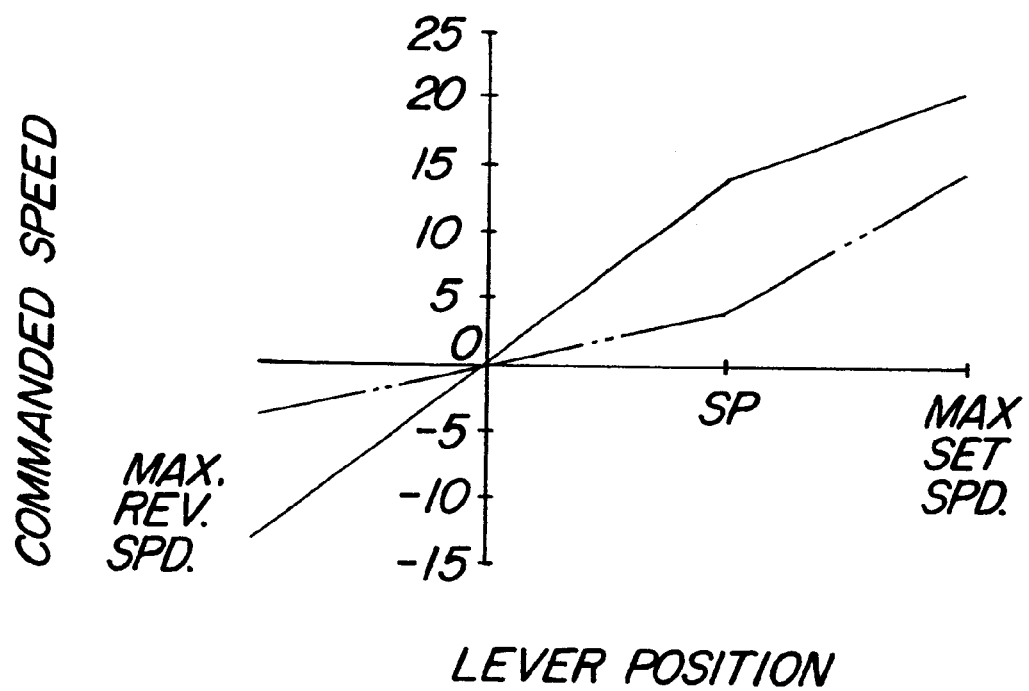
FIG. 8 an exemplary graph of the control lever position versus the commanded speed for another embodiment of the control device according to the present invention.

A further embodiment is illustrated in FIG. 8 having an adjustable set point speed and an adjustable maximum speed. The set point speed is commanded when the control lever is moved to the set point position and can be adjusted by one of the potentiometer knobs 92, 94 shown in FIG. 5. The second potentiometer knob is used to input an adjustable maximum speed. Two curves are shown in FIG. 8 illustrating two different scenarios of the speed settings. The solid line shows a set point speed of 14 km/h and a maximum speed of 20 km/h. The broken line shows the set point speed at 4 km/h and the maximum speed at 14 km/h. The two set speeds enable the operator to adjust the speed commanded at two different forward positions of the control lever. This also gives the operator more control over the slope of the curve between the set point position and the maximum speed position of the control lever. While this embodiment shows two adjustable set points and set point positions of the control lever, it will be recognized that three or more set points can be provided in the control device if desired.

Figure 7:
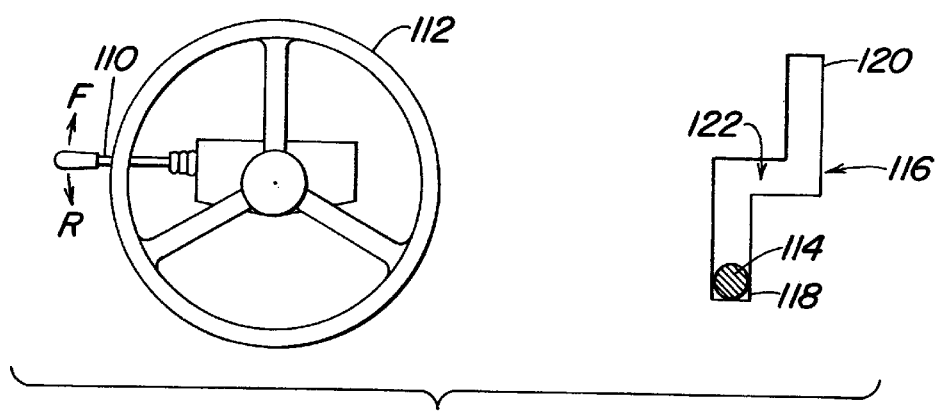
FIG. 7 is a schematic view of an alternative embodiment of the control device of the present invention.

In another embodiment of the invention shown in FIG. 7, two levers are used for operator control of the transmission. A left hand direction lever 110 is mounted to the steering column beneath the steering wheel 112. The direction lever is moved forward and rearward to command forward and reverse travel directions respectively as shown by the arrows in FIG. 7. In the illustrated center position of the lever, a zero speed is commanded. The right hand lever 114 only commands the machine speed. The speed lever 114 moves in a slot 116 in a panel between a minimum speed position 118 and a maximum speed position 120. The minimum speed is close to, but not equal to, zero. All positions of the speed lever 114 command a speed. A zero speed is commanded by the left hand direction lever in the center position, regardless of the position of the speed lever 114. A set point speed is commanded by a set point position 122 of the lever, defined by a jog in the slot 116. The set point position can be defined by means other than the jog as discussed above.

While the direction lever 110 is shown mounted to the steering column, it will be appreciated that the direction lever 110 can be located elsewhere on the operator's station if desired.

The IVT control device of the present invention enables the operator to pre-adjust one or two set point speeds that are commanded when the control lever is moved to a set point position. This enables the operator to conveniently and accurately return to a particular speed desired by the operator.

The invention should not be limited to the above-described embodiments, but should be limited solely by the claims that follow.

We claim:

1. A control device for an infinitely variable transmission comprising:
   a control lever movable between a minimum speed position and a maximum speed position, the control lever having a set point position intermediate the minimum speed position and the maximum speed position, the set point position corresponding to a set point speed;
   a set speed adjuster for an operator to adjust a set point speed corresponding to the set point position of the control lever; and
   wherein a transmission speed is variable between the minimum speed and the set point speed for positions of the control lever between the minimum speed position and the set point position and the transmission speed is variable between the set point speed and the maximum speed for positions of the control lever between the set point position and the maximum speed position.

2. The control device as defined by claim 1 wherein the control lever is movable in one direction between the minimum speed position and the maximum speed position with a transverse jog at the set point position intermediate the minimum speed position and the maximum speed position.

3. The control device as defined by claim 1 wherein the control lever is rotatable about a pivot axis to move between the minimum speed position and the maximum speed position.

4. The control device as defined by claim 1 wherein the transmission speed varies proportionally between the minimum speed and the set point speed and between the set point speed and the maximum speed as the control lever is moved between the minimum speed position and the set point position and between the set point position and the maximum speed position.

5. A control device for an infinitely variable transmission comprising:
   a control lever movable forward between a zero speed position and a maximum forward speed position, the control lever having a set point position intermediate the zero speed position and the maximum forward speed position, the set point position corresponding to a set point speed, the control lever further being movable rearward between the zero speed position and a maximum reverse speed position;
   a set speed adjuster for an operator to adjust a set point speed corresponding to the set point position of the control lever; and
   wherein transmission speed is variable between zero and the set point speed for positions of the control lever between the zero speed position and the set point position and the transmission speed is variable between the set point speed and the maximum forward speed for positions of the control lever between the set point position and the maximum forward speed position.

6. The control device as defined by claim 5 wherein the maximum reverse speed is the adjusted set point speed.

7. The control device as defined by claim 5 wherein the control lever is movable in a pattern of slots in a guide plate, the slots including a forward direction and speed slot, a reverse direction and speed slot and a park slot;
   wherein at the zero position, the control lever is laterally movable among the three slots; and
   further comprising a sensor to detect in which of the three slots the control lever is positioned.

8. A control device for an infinitely variable transmission comprising:
   a controller coupled to the transmission and having plural inputs;
   a control lever movable forward between a zero speed position and a maximum forward speed position, the control lever further being movable rearward between the zero speed position and a maximum reverse speed position, and the control lever having a set point position intermediate the zero speed position and the maximum forward speed position, the set point position corresponding to a set point speed;
   a position sensor coupled to the control lever and to the controller to input to the controller the position of the control lever; and
   a set speed adjuster for an operator to adjust a set point speed corresponding to the set point position of the control lever, the adjuster being coupled to the controller to input the set point speed to the controller.

9. The control device as defined by claim 8 wherein the control lever is movable in a pattern of slots in a guide plate, the slots including a forward direction and speed slot, a reverse direction and speed slot and a park slot;
   wherein at the zero position, the control lever is laterally movable among the three slots; and
   further comprising a sensor to detect in which of the three slots the control lever is positioned, the sensor being coupled to the controller to input to the controller the slot in which the control lever is positioned.

10. The control device as defined by claim 8 wherein the control lever moves from one position to another by rotation about a pivot axis and wherein the position encoder is a rotary position encoder.

11. The control device as defined by claim 8 further comprising a second set speed adjuster for an operator to adjust a second set point speed corresponding to the set point position of the control lever, the second adjuster being coupled to the controller to input the second set point speed to the controller; and an operator controlled adjustor switch to adjust the set point speed or the second set point speed, the adjustor switch being coupled to the controller to input the chosen set point speed.

12. The control device as defined by claim 8 further comprising a visual display of the set point speed.

13. A control device for an infinitely variable transmission comprising:

a controller coupled to the transmission;

a movable control lever;

a guide plate having a guide slot therein with the control lever extending therethrough to guide the movement of the control lever, the guide slot having a forward direction and speed slot, a reverse direction and speed slot and a park slot and when the control lever is at the zero speed position, the control lever is laterally movable among the three slots in a zero speed position lateral slot;

the control lever being movable within the forward direction and speed slot from the zero speed position to a maximum forward speed position, the control lever further being movable within the reverse direction and speed slot from the zero speed position to a maximum reverse speed position;

the control lever further having a set point position for the control lever intermediate the zero speed position and the maximum forward speed position, the set point position corresponding to a set point speed;

a position sensor coupled to the control lever to input to the controller the position of the control lever;

a set speed adjuster for an operator to adjust a set point speed;

wherein transmission speed is variable between zero and the set point speed for positions of the control lever between the zero speed position and the set point position and the transmission speed is variable between the set point speed and the maximum forward speed for positions of the control lever between the set point position and the maximum forward speed position.

14. The control device as defined by claim 13 wherein the forward direction and speed slot has a transverse jog at the set point position.

15. The control device as defined by claim 13 wherein the control lever rotates about a first pivot axis as the control lever moves through the forward direction and speed slot, the reverse direction and speed slot and the park slot, and wherein the control lever rotates about a second pivot axis normal to the first pivot axis as the control lever moves transversely with the zero speed lateral slot.

16. The control device as defined by claim 13 further comprising a friction device to hold the control lever in the selected position in the guide slot.

17. The control device as defined by claim 16 wherein the friction device includes a friction washer about the first pivot axis.

18. The control device as defined by claim 13 further comprising a sensor to detect and input to the controller in which of the three slots the control lever is positioned.

19. The control device as defined by claim 13 wherein the position encoder is a rotary encoder.

20. The control device as defined by claim 13 further comprising a bias spring urging the control lever to the park slot when the control lever is in the lateral zero speed slot.

21. The control device as defined by claim 13 wherein the control lever rotates about the first pivot axis as the control lever moves between the maximum forward speed and the maximum reverse speed and the travel distances for the control lever between the zero speed position and the set point position, between the set point position to the maximum forward speed position, and between the zero speed position to the maximum reverse speed position are approximately equal.

22. A control device for an infinitely variable transmission comprising:

a control lever movable between a minimum speed position and a maximum speed position, the control lever having a set point position intermediate the minimum speed position and the maximum speed position, the set point position corresponding to a set point speed;

a first set speed adjuster for an operator to adjust a first set point speed corresponding to the set point position of the control lever;

a second set speed adjuster for an operator to adjust a second set point speed corresponding to the set point position of the control lever;

an operator controlled selector switch to select between the first and second set point speeds; and wherein transmission speed is variable between the minimum speed and the first or second set point speed for positions of the control lever between the minimum speed position and the set point position and the transmission speed is variable between the first or second set point speed and the maximum speed for positions of the control lever between the set point position and the maximum speed position depending on the position of the selector switch.

23. The control device as defined by claim 22 wherein the minimum speed is zero.

24. A control device for an infinitely variable transmission comprising:

a control lever movable between a minimum speed position and a maximum speed position, the control lever having first and second set point positions, the first and second set point positions corresponding to first and second set point speeds;

first and second set speed adjusters for an operator to adjust the first and second set point speeds, respectively, corresponding to the first and second set point positions of the control lever; and wherein a transmission speed is variable between the minimum speed and the first set point speed for positions of the control lever between the minimum speed position and the first set point position and the transmission speed is variable between the first set point speed and the second set point speed for positions of the control lever between the first set point position and the second set point position.

25. The control device as defined by claim 24 wherein the second set point speed is the maximum speed.

* * * * *